United States Patent
Zametzky

(10) Patent No.: US 6,636,024 B2
(45) Date of Patent: Oct. 21, 2003

(54) SWITCHING VOLTAGE CONVERTER WITH HALF BRIDGE OUTPUT AS REFERENCE VOLTAGE

(75) Inventor: Klaus Zametzky, Fürth (DE)

(73) Assignee: Semikron Elektronik GmbH, Nuremberg (DE)

(*) Notice: Subject to any disclaimer, the term of this patent is extended or adjusted under 35 U.S.C. 154(b) by 0 days.

(21) Appl. No.: 10/096,094

(22) Filed: Mar. 12, 2002

(65) Prior Publication Data

US 2002/0131286 A1 Sep. 19, 2002

(30) Foreign Application Priority Data

Mar. 13, 2001 (DE) .......................... 101 11 913

(51) Int. Cl.$^7$ ................................ G05F 1/40
(52) U.S. Cl. ................ 323/282; 323/223; 323/224; 363/98; 363/132
(58) Field of Search .................. 323/223, 224, 323/225, 282, 285, 289; 363/17, 21.04, 21.07, 21.12, 21.15, 98, 132; 330/10, 207, 251

(56) References Cited

U.S. PATENT DOCUMENTS

| 4,488,438 A | 12/1984 | Tomita |
| 6,016,075 A | * 1/2000 | Hamo ........................ 330/10 |
| 6,222,751 B1 | * 4/2001 | Portaluri et al. ............. 363/132 |
| 6,232,833 B1 | * 5/2001 | Pullen .......................... 330/10 |
| 6,396,933 B1 | * 5/2002 | Jung et al. .................... 381/96 |

FOREIGN PATENT DOCUMENTS

| DE | 33 11 662 A1 | 10/1983 |
| JP | 63-253720 | 10/1988 |

OTHER PUBLICATIONS

Tietz, Ulrich and Schenck, Christoph, "Stromversorgung", Halbleiter–Schalaltungstechnik, pp. 566–586, Edition 9, 1989, Berlin [u.a] Germany.

Tietz, Ulrich and Schenck, Christoph, "Electronic Circuits: Design and Applications" pp. 507–525, 1991, Berlin, Germany (English translation of "Stromversorgung", pp. 566–586).

* cited by examiner

Primary Examiner—Michael Sherry
Assistant Examiner—Gary L. Laxton
(74) Attorney, Agent, or Firm—Darby & Darby

(57) ABSTRACT

A switching voltage converter in half bridge topology operates in switching mode with variable locking, consisting of two power switches, and one control circuit. The TOP switch is realized by one or more n-channel transistors. The BOT switch is realized by one or more p-channel transistors. The output Upwm of the half bridge is selected as a reference potential, which is not constant and varies during operation, for the control circuit and supply voltage Ubtop, Ubbot of the drivers of the TOP and BOT switch.

6 Claims, 8 Drawing Sheets

SWITCHING VOLTAGE CONVERTER WITH HALF BRIDGE OUTPUT AS REFERENCE VOLTAGE

BACKGROUND

The invention relates to switching voltage converters in halfbridge topology such as switching power supplies, DC/DC converters or class "D" amplifiers (amplifiers operating in switching mode). The purpose of switching voltage converters such as primary-switched power supplies or DC/DC converters is to transform voltages and currents with potential separation. The centrepiece in the design of such converters or transformers is a high-frequency transformer which transmits the energy with potential separation.

Primary-switched power supplies and DC/DC converters are manufactured worldwide in very large numbers. They find application in industrial electronics, household appliances, entertainment electronics, as well as in PCs and telecommunication devices.

The following characteristics are of particular importance for switching power supplies:

high efficiency and resulting low heat dissipation compact design low weight good quality of output voltage favorable price high reliability the smallest possible number of components.

A number of converter principles are used in the prior art. We can generally differentiate between two basic types: forward converters and flyback converters. These are described by examples by Tietz/Schenk, chapter 18 (ISBN 3-540-19475-4, 9th edition). Flyback converters are regarded as advantageous in the prior art, since—in addition to their high efficiency—they also provide good quality output voltage (e.g. in case of DC voltage sources a low amount of residual pulsation, or ripple).

To realize a compact arrangements with low weight, a flyback converter is chosen which can transmit as much power as possible using a given high-frequency transformer. This makes it practical to transmit the required power through the smallest possible core. This not only has cost advantages but also allows for a more compact switching arrangement.

Push-pull converters meet these requirements. Due to their working principle, they can—under equal conditions—transport about twice the power through a given magnet core than single-ended converters. The maximum power that can be transmitted through a magnet core also depends on the coil space utilized by the transformer. Optimal coil space utilization is ensured by converters in half bridge or full bridge topology, since they need only a primary coil which carries a current in all phases of magnetic flow formation.

To control the output voltage of a halfbridge converter, a control circuit uses pulse width modulator (PWM), for example, in which the duty ratio is adjusted so that it responds to a given control variable to maintain the output voltage or current at a desired setpoint. It is also necessary to synchronize the duty ratio of both switches of a half bridge arrangement to generate an AC voltage without a DC component at the output of the half bridge.

In the prior art, the two switches of the half bridge arrangement are realized using two n-channel transistors. The control circuit of the pulse width modulator generates two signals in such a way that, to prevent short circuits, only one of the two switches is closed at any given time. These are called mutually exclusive, also called "one-hot", control signals. In a large number of applications, the supply voltage or intermediate circuit voltage is higher than the operating voltage of the pulse width modulator.

According to prior art, a pulse width modulator is realized using a voltage source which generates a delta voltage or sawtooth voltage. The instantaneous amplitude of the delta or sawtooth voltage is compared with a control voltage by a comparator. A D flip-flop controls two AND gates to generate alternating ON signal for drivers which control the two switches of the half bridge arrangement. (Tietze/Schenk, chapter 18.7.5).

The advantage of the half bridge converter topography is that in contrast with other topologies, a small HF transformer can be used. However, a disadvantage is the technical complexity in controlling the switches of the half bridge.

The prior art requires generating two separate signals, one each for the switch in TOP position and the switch in BOT position. These two signals must be mutually exclusive and they must have exactly the same pulse lengths.

Since a large number of applications have a supply voltage or an intermediate circuit voltage which is higher than the operating voltage of the pulse width modulator, and since the reference potential of the pulse width modulator is at the reference potential of the BOT switch, it is also necessary to provide an expensive level shifter for controlling the TOP switch.

This increases the expense for technology even further, since a level shifter is also required to adjust the level of the control signal for the TOP switch of the half bridge arrangement. Such level shifters impose not only with additional design requirements, but also entail additional financial costs.

There are integrated components on the market for generating the pulse width modulated signals. However, when the supply voltage or intermediate circuit voltage is higher than the operating voltage of the pulse width modulator control circuit, control of the power switch in the TOP position still requires considerable technical complexity.

Since it involves such high technical complexity, this half bridge topology is applied only to special converters requiring this technology or to high-power converters.

Included in the prior art is DE 33 11 662, in which a circuit arrangement is intended for use in an electromagnetic flowmeter, and JP 632 537 20. These two circuit arrangements do not achieve the objects of the present invention, since they introduce a half bridge arrangement with a constant locking time.

The reason for this constant locking time is the type of control of the TOP and the BOT switches by a driver.

OBJECTS AND SUMMARY OF THE INVENTION

It is an object of the present invention to provide a circuit which substantially reduces the technical complexly in controlling the half bridge in switching voltage converters with variable locking in half bridge topology.

It is a further object of the invention to provide a circuit which avoids the use of level shifters, which are sometimes necessary in prior art when the supply voltage or intermediate circuit voltage is higher than the operating voltage of the pulse width modulator control circuit.

In contrast to the prior art, the solution according to the invention uses a p-channel transistor, such as a bipolar transistor, MOS transistor or an IGBT (insulated gate bipolar transistor). This is the equivalent of a so-called source design or emitter/follower design Thus, the final step in this case is not designed as a half bridge as in the prior art, but in accordance with the invention as a so-called complementary source follower step.

The potential of the output signal of the half bridge is chosen as the reference potential for controlling the pulse width modulator. Generally this has no detrimental effect, since the control variable in a large number of applications is transferred with separate potential from the secondary side to the primary side or power supply side. Thus, with the solution according to the invention, the need for a level shifter for level adjustment is eliminated.

According to an embodiment of the invention, there is provided a switching voltage converter in half bridge topology which operates in switching mode with variable locking, consisting of two power switches and one control circuit. The TOP switch is realized by one or more n-channel transistors. The BOT switch is realized by one or more p-channel transistors. The $out_{pwm}$ of the half bridge is selected as a reference potential, which is not constant and varies during operation, for the control circuit and supply voltage $Ub_{top}$, $Ub_{bot}$ of the drivers of the TOP and BOT switch.

According to an embodiment of the invention, there is provided a switching voltage converter in half bridge topology with variable locking, comprising: first and second power switches, a control circuit, a TOP switch which includes at least one n-channel transistor, a BOT switch which includes at least one p-channel transistor, and an output $U_{pwm}$ of the half bridge is applied as a reference potential which is not constant and which varies during operation for the control circuit and supply voltage $Ub_{top}$, $Ub_{bot}$ of the drivers of the TOP and BOT switches.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
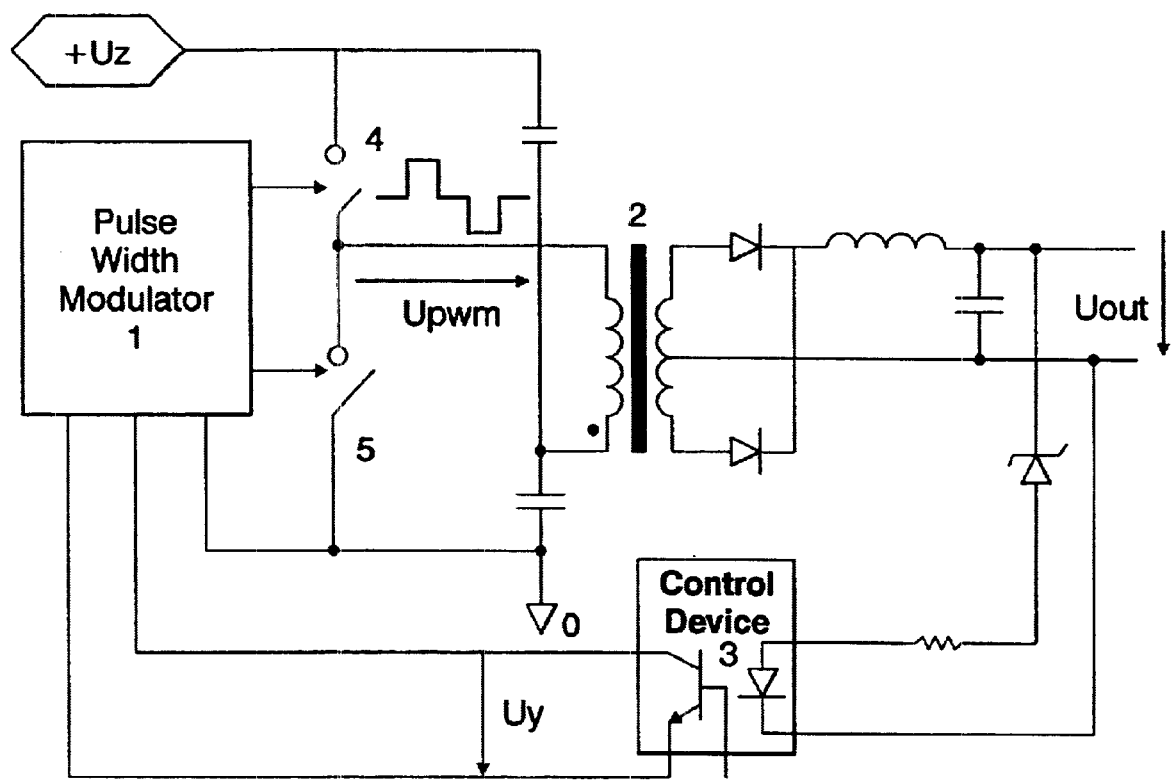
FIG. 1 is a switching power supply in half bridge topology according to prior art.

Referring to FIG. 1, a switching power supply in half bridge topology according to prior art includes an input for a DC voltage $U_z$ of the supply circuit or intermediate circuit. The DC voltage $U_z$ is chopped by means of a pulse width modulator 1 and the power switches 4, 5, and applied to the high-frequency transformer 2. The pulse width modulator 1 is controlled via a DC isolated, galvanically separated, control device 3, which may be, for example, an optocoupler or transmitter, in such a way that, after smoothing, the desired output voltage $U_{out}$ is produced. In this case, the voltage $U_y$ serves as the manipulated variable of the control device. For the sake of simplicity, the necessary driver circuit of power switches 4, 5 is not shown here. In such half bridge circuits, the following requirements must be established for the control of the switches 4, 5:

Both switches, that in TOP position 4 and that in BOT position 5, must be controlled with mutually exclusive signals, i.e., only one of the two switches may be closed at any given time, to prevent short circuits.

Both switches 4, 5 must be controlled by the pulse width modulator 1 with a variable duty ratio to generate the desired output voltage $U_{out}$ when suitably influenced by the control device 3.

It is necessary to synchronize the duty ratio of the TOP switch 4 with that of the BOT switch 5, i.e., both switches must be in the closed state for the same time during a cycle.

Figure 2:
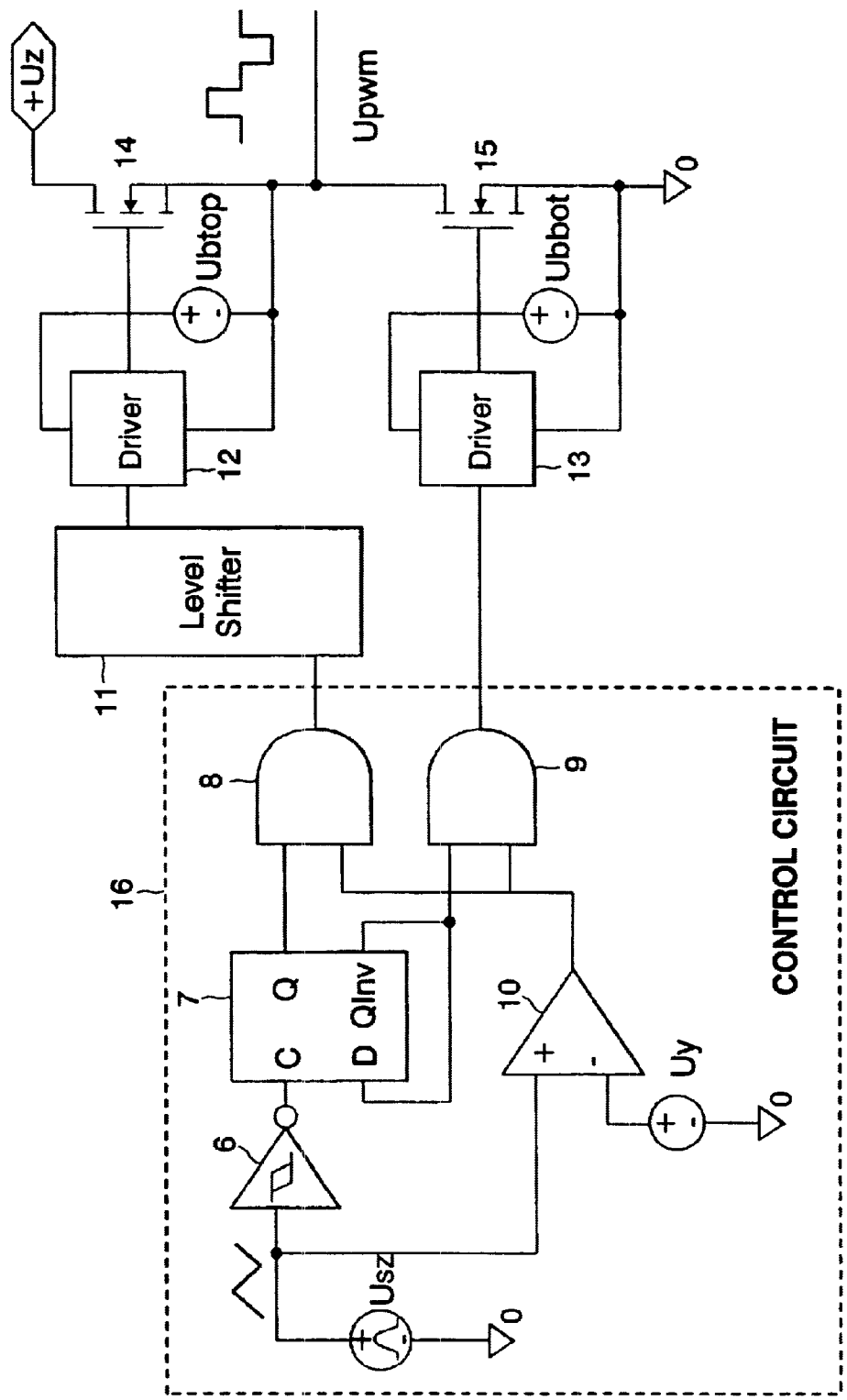
FIGS. 2 and 3 show details on the primary side of a switching power supply in half bridge topology according to prior art.
Figure 3:
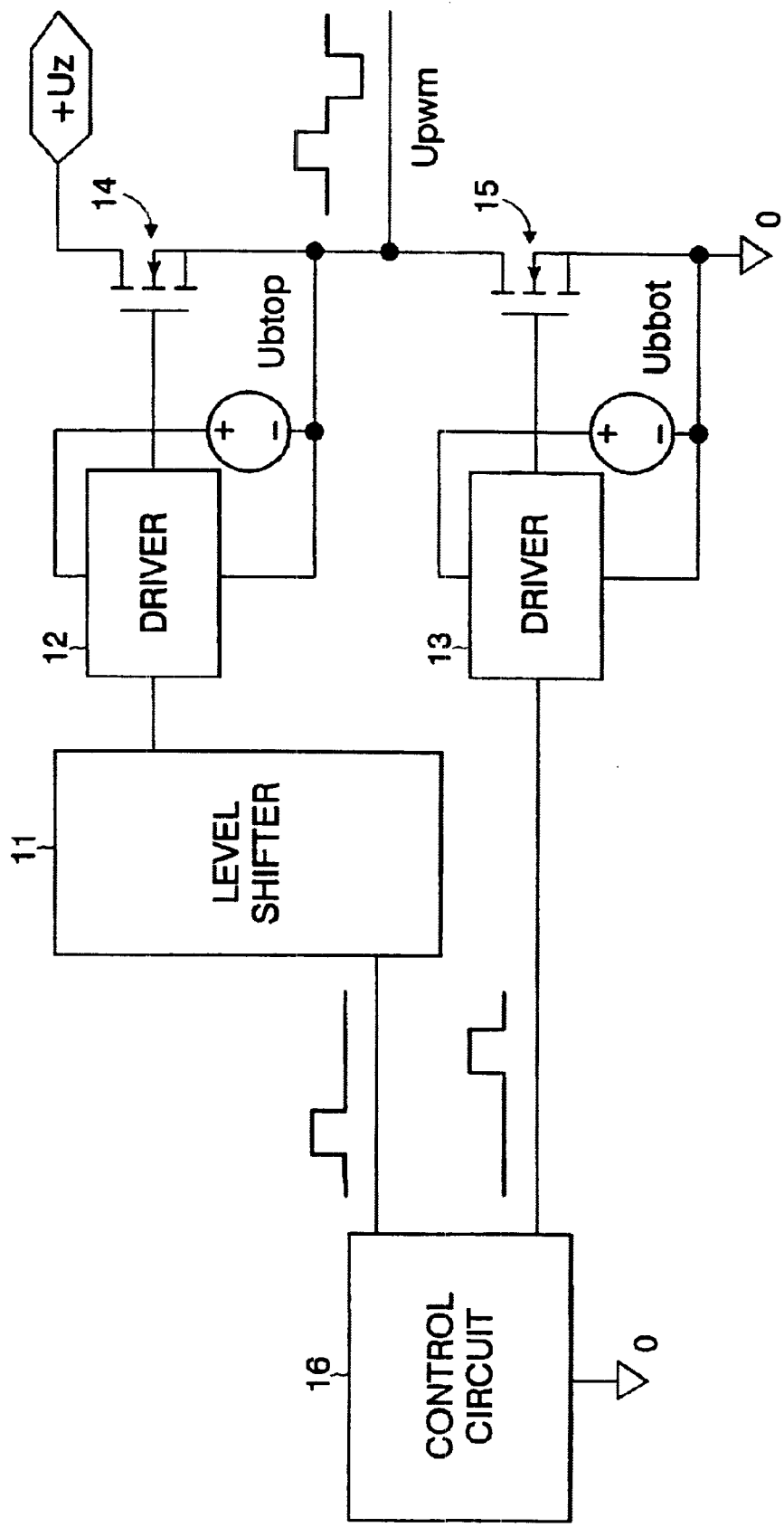

FIGS. 2 and 3 show the control circuit of a half bridge converter according to the prior art. In this case, for the sake of simplicity, the voltage source $U_y$ is shown as the manipulated variable to the control device. As an example, the control circuit 16 of the pulse width modulator is realized here as follows:

The voltage source $U_{sz}$ generates a delta-shaped or sawtooth-shaped output signal. The voltage of source $U_{sz}$ is compared with the manipulated voltage $U_y$ by means of the comparator 10. The output signal of the comparator 10 is fed to two AND gates 8, 9. A hysteresis switch 6 generates the timing signal for the D flip-flop 7 from the voltage $U_{sz}$. This feedback D flip-flop reverses at each positive timing slope of 6 and thus alternately enables the first 8 or second 9 AND gate. In this manner, two separate mutually exclusive signals are generated for the drivers 12, 13 of the TOP 14 or BOT 15 switches.

If the supply voltage or intermediate circuit voltage $U_z$ is higher than the operating voltage of the control circuit of the pulse width modulator, an additional potential adapter or level shifter 11 must be used to control the driver 12 of the TOP switch 14.

Figure 4:
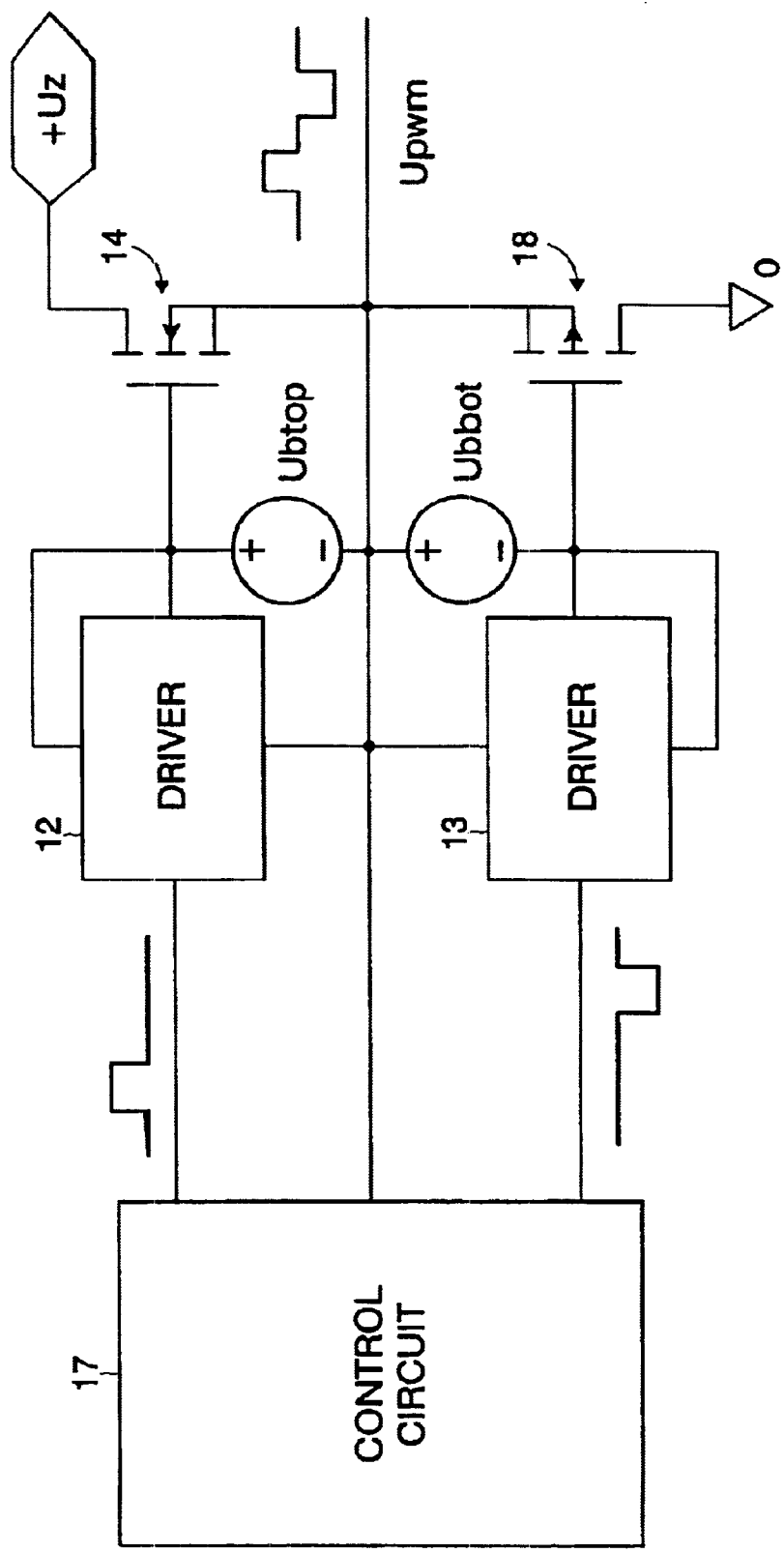
FIG. 4 shows the principle of the pulse width modulator design according to an embodiment of the invention.
Figure 5:
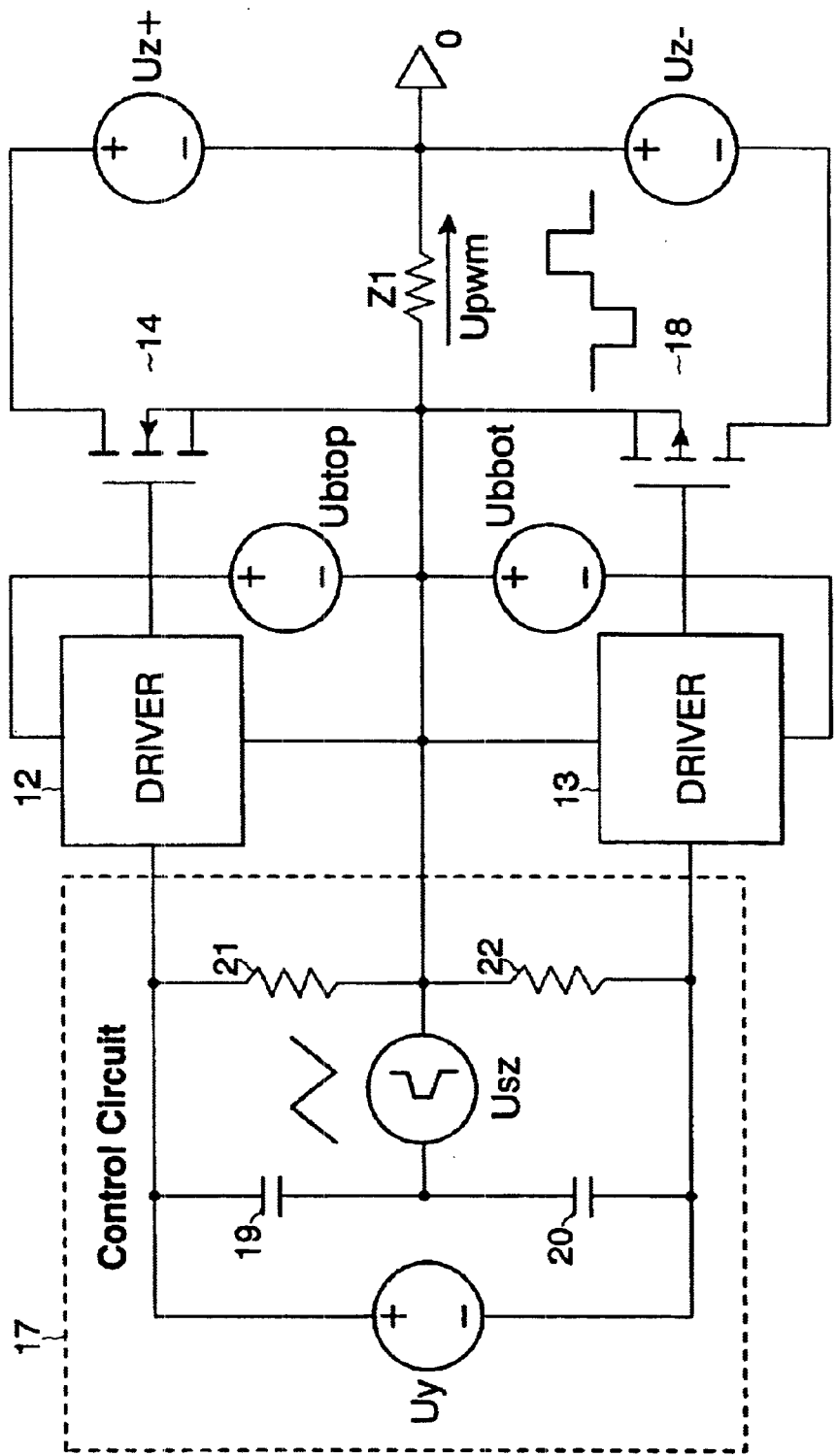
FIG. 5 shows the reduced technical complexity of a pulse width modulator according to the invention in comparison with the circuit shown in FIG. 2.

FIG. 4 shows the principle of the inventive design of the control circuit 17 of the pulse width modulator and the design of the drivers 12, 13 of the power switches 14, 18. Instead of the n-channel transistors used for both power switches in the prior art, the BOT switch 18 is realized according to the invention by a p-channel transistor in this case a p-channel MOS transistor. Thanks to that choice and to the fact that the reference potential of the entire control circuit is chosen to be the same as the output signal of the half bridge, the control circuit of the pulse width modulator can be substantially simplified in comparison with the prior art, as FIG. 5 shows by means of an example.

The voltage $U_y$ as the manipulated variable of the control device is transmitted with separate potential from the secondary side of the switching power supply to the primary side, as is also shown in FIG. 1 by means of an example. For that reason, this manipulated variable is shown in FIG. 5 as the voltage source $U_y$, for the sake of simplicity. The inventive idea of the pulse width modulator is realized by a voltage source $U_{sz}$ and by the passive components 19–22. Also according to the invention is the design of the BOT switch 18 as a source follower. The reference potential of the control circuit matches the variable potential of the output signal of the half bridge. Since, as described above, the manipulated variable $U_y$ is transmitted with separate potential from the secondary side to the primary side, this is not a disadvantage of the circuit according to the invention. The function is described in detail below.

The voltage source $U_{sz}$ provides a delta voltage which is applied via the two capacitors 19, 20 to the control inputs of the driver stages 12, 13. Such driver stages are provided with defined switching thresholds. When the control voltage at the input of the driver stage is higher than the switching threshold, the output voltage of the driver stage is near its positive or otherwise near its negative supply voltage. The driver supply or output voltage is sufficient to switch the transistors 14, 18 as desired. When $U_y$=0V, the input voltages of the two driver stages 12, 13 are at identical potential. When $U_{sz}$ is above the turn-on potential of the driver 12 in TOP position, the driver applies its positive supply voltage to the gate of the transistor 14, and the transistor is turned on. At the same time, $U_{sz}$ is also applied to the input of the driver 13 in BOT position, and this driver also switches its positive supply voltage to the gate of the transistor 18. The positive supply voltage of the BOT driver 13 equals the source potential of the transistor 18. Thus, a source/gate potential of approximately 0V results at the transistor 18, and the BOT transistor 19 is therefore safely turned off. When $U_{sz}$ drops below the switching threshold of the TOP driver 12, this driver turns off the transistor 14. The delta voltage $U_{sz}$ continues to drop until it falls below the switching threshold of the BOT driver 13. Thus, the BOT driver 13 applies its negative supply voltage to the gate of the BOT transistor 18, which is turned on. During the time period in which the $U_{sz}$ lies between the switching thresholds of driver 12 and driver 13, both switches 14, 18 are closed. The magnitude of $U_{sz}$ is chosen so that its maximum value is just above the switching threshold of the TOP driver 12 and its minimum value is just below the switching threshold of the BOT driver 13. Therefore, when $U_y$ equals 0V, an output signal of the half bridge with a very small duty ratio will result. When $U_y$ is higher than zero, a voltage offset is added to the inputs which extends the turn-on times and thus increases the duty ratio of the output signal of the half bridge.

In the pulse width modulator design according to the invention, a level shifter is no longer necessary, not even when the supply voltage or intermediate circuit voltage $U_z$ is higher than the operating voltage. The design according to the invention is not a classical half bridge, but a complementary source follower step. Since the reference potential of the control circuit equals the output signal of the half bridge, no lever shifter is necessary.

Now, the entire control circuit consists only of the driver steps 12, 13 for the power switches, the delta voltage source $U_{sz}$, the manipulated variable $U_y$ and a very simple network consisting of the passive components 19–22. Gate drivers known in the prior art have defined switching thresholds and a sufficiently large amplification that they can therefore participate in the function of a comparator (see ref 10 in FIG. 2). Thanks to the level shifter mechanism according to the invention, the TOP transistor 14 and the BOT transistor 18 are turned on alternately without the necessity of a flip flop or a logic circuit.

Figure 6:
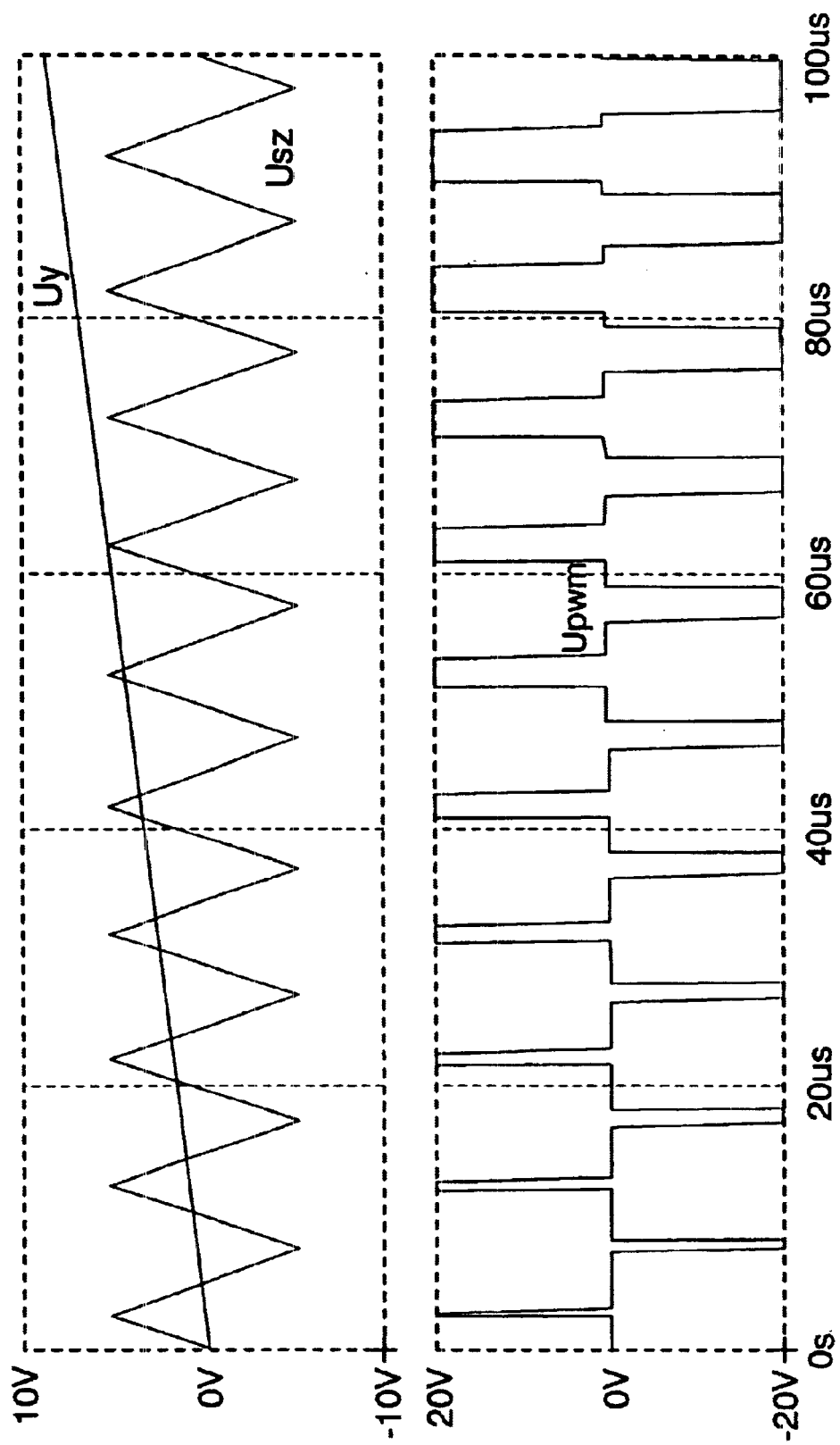
FIG. 6 shows simulation results of a pulse width modulator according to FIG. 5.

FIG. 6 shows simulation results of the pulse width modulator according to the invention as shown in FIG. 5. In the upper part, the time progression of the delta voltage $U_{sz}$ and the manipulated variable voltage $U_y$ is shown. The lower part shows the progress of the output voltage $U_{pwm}$ of the control circuit. Thus, the following points could be verified:

When the manipulated voltage $U_y$ is increased, the duty ratio of the control signals increases;

as required, both signals are mutually exclusive;

the duty ratios between the TOP and BOT switches are synchronized.

Figure 7:
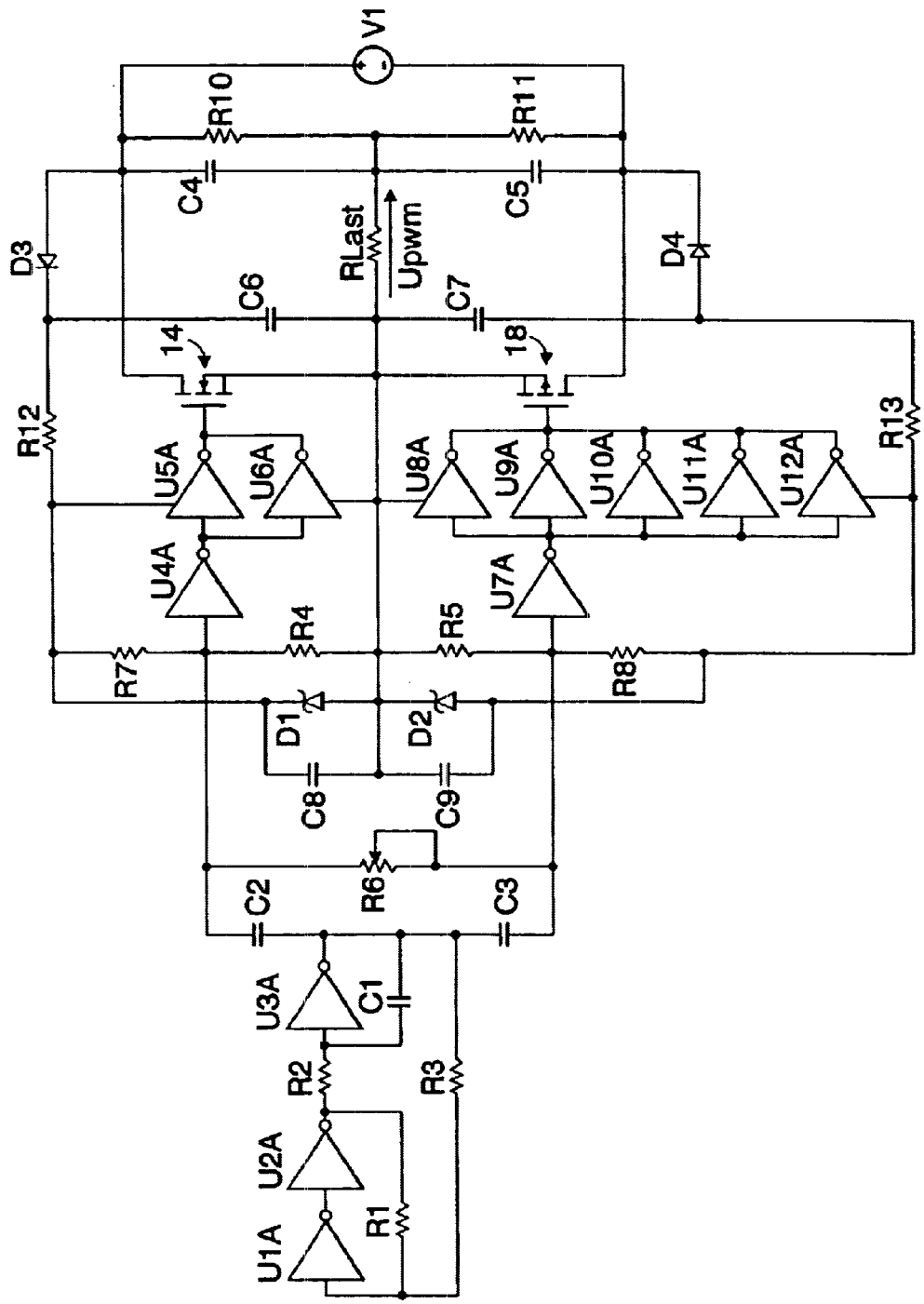
FIG. 7 shows a pulse width modulator according to FIG. 5 designed with standard components.

FIG. 7 shows a pulse width modulator design according to the invention using standard components. For signal generation and amplification simple CMOS inverters in an unbuffered version are used which consists of only one complementary transistor pair. Thanks to this simple design, such an inverter constitutes a low pass of low order and can therefore also be used in linear operation. Thus it is possible to operate step U3A as an integrator. Jointly with U1A and U2A, which form a comparator, an oscillator is formed which supplies a delta output voltage. With R6, the duty ratio of output signal $U_{pwm}$ can be changed. When R6 is replaced by the secondary side of an optocoupler, the duty ratio of the voltage Upwm can be controlled with separate potential via a current or a voltage, as is necessary, (for example, in the case of a primary-switched power supply FIG. 1). U4A–U6A drive the n-channel MOS transistor in TOP position, and U7A to U12A drive the p-channel MOS transistor in BOT position. Power for the control circuit is supplied via a double charge-pump mechanism around D3, D4, C6, C7.

Figure 8:
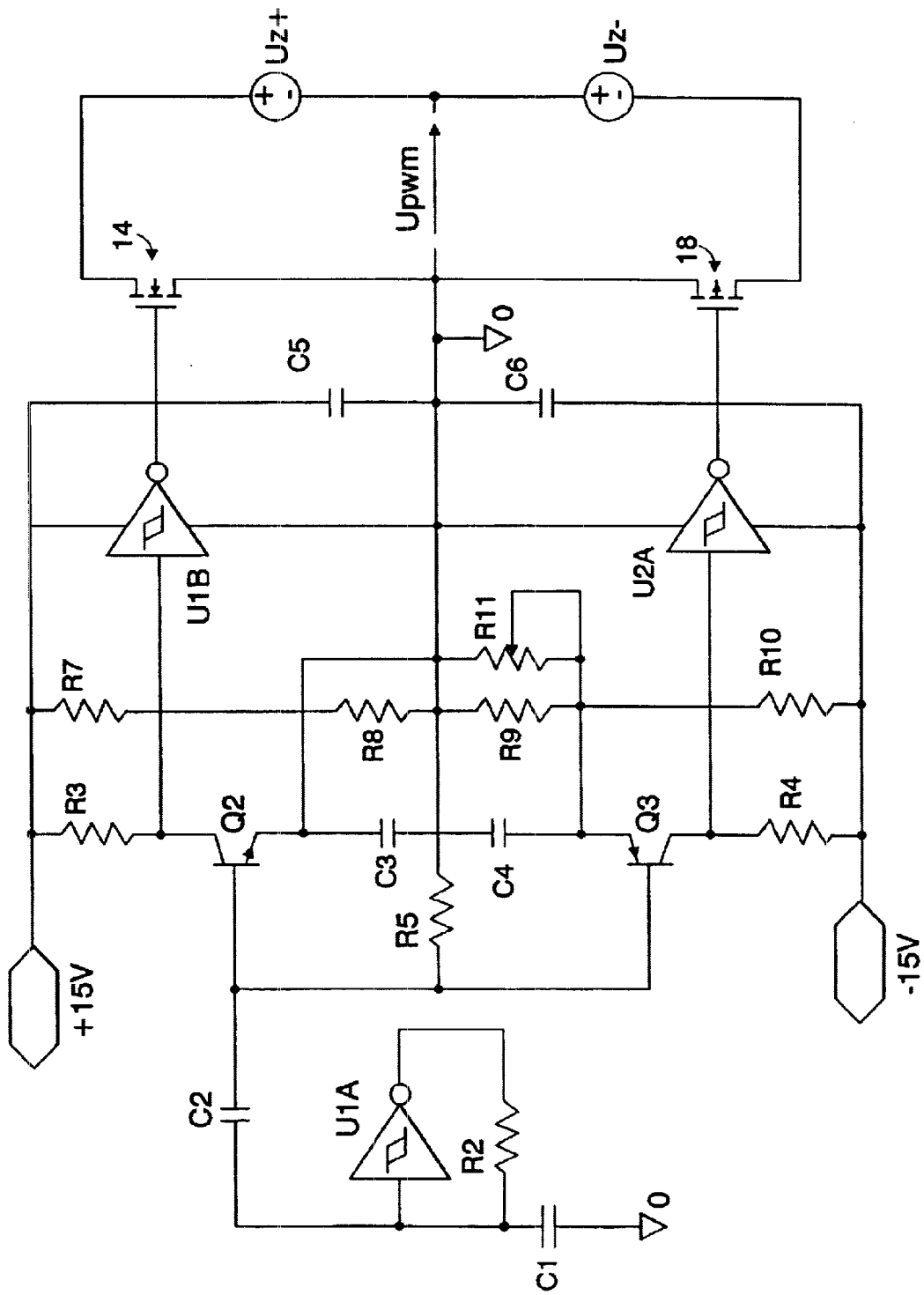
FIG. 8 shows another variation for realizing the design of a pulse width modulator.

FIG. 8 shows another realization version. The inverters used in this case are provided with hysteresis switching characteristics. An oscillator is formed with the inverter U1A. In this version, the locked PWM signal is generated by a complementary transistor stage Q1, Q2 which is operated in Class C mode. The higher the negative bias of the C operation is set shown here for the sake of simplicity by the potentiometer R11, the longer is the locking time between the input signal for the TOP switch and that of the BOT switch. The switching signal for the TOP (or BOT) switch transistor is coupled at the collector by Q1 or Q2 and converted by U2A or U3A into a switching signal with a high rate of change. This version has mainly the following advantages:

High interference immunity through the use of gate steps with hysteresis switching characteristics;

safe locking between the PWM signal for the TOP transistor and that of the BOT transistor;

extremely cost-effective realization of a PWM for high intermediate circuit voltages;

few components required.

In this version, the duty ratio of the PWM signals for simulation purposes is set by the potentiometer POT R11. When POT R11 is replaced by the secondary side of an optocoupler, the duty ratio of the voltage $U_{pwm}$ can be controlled with separate potential via a current or a voltage, as is necessary, (for example, in the case of a primary-switched power supply FIG.1).

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A switching voltage converter in half bridge topology with variable locking, comprising:

first and second power switches;

a control circuit; and first and second drivers;

the first power switch (TOP) comprising at least one n-channel transistor;

the second power switch (BOT) comprising at least one p-channel transistor;

the first and second drivers each having a respective variable supply voltage source ($Ub_{top}$, $Ub_{bot}$);

wherein an output ($U_{pwm}$) of said half bridge is applied as a reference potential to said control circuit and to each said respective supply voltage source; and wherein said reference potential varies during circuit operation.

2. A switching voltage converter according to claim 1, wherein said each respective supply voltage source is floating and biased by said output.

3. A switching voltage converter according to claim 1, wherein said power switches are one of bipolar transistors, IGBT or MOS transistors.

4. A switching voltage converter according to claim 1, further comprising a pulse width modulator with a voltage source ($U_{sz}$), producing a delta voltage wave form for generating a control signal input to said drivers.

5. A switching voltage converter according to claim 1, further comprising:

means for regulating a control signal input;

wherein said means employs a voltage ($U_y$) which is generated by one of an optocoupler and transformer in response to an output of said converter.

6. A switching voltage converter according to claim 1, wherein said power switches are in a source follower configuration.

* * * * *

UNITED STATES PATENT AND TRADEMARK OFFICE
CERTIFICATE OF CORRECTION

PATENT NO. : 6,636,024 B2
DATED : October 21, 2003
INVENTOR(S) : Klaus Zametzky

It is certified that error appears in the above-identified patent and that said Letters Patent is hereby corrected as shown below:

<u>Title page,</u>
Item [73], Assignee, please delete "Nuremberg" and substitute -- Nurnberg --.

Signed and Sealed this

Ninth Day of March, 2004

JON W. DUDAS
*Acting Director of the United States Patent and Trademark Office*